(12) United States Patent
Song et al.

(10) Patent No.: US 9,897,738 B2
(45) Date of Patent: Feb. 20, 2018

(54) BACKLIGHT UNIT AND A DISPLAY APPARATUS INCLUDING THE SAME

(71) Applicant: SAMSUNG DISPLAY CO., LTD., Yongin-si, Gyeonggi-Do (KR)

(72) Inventors: Min-Young Song, Asan-si (KR); Dongyeon Kang, Seoul (KR); Sunhee Oh, Anyang-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 132 days.

(21) Appl. No.: 14/980,005

(22) Filed: Dec. 28, 2015

(65) Prior Publication Data
US 2016/0231496 A1    Aug. 11, 2016

(30) Foreign Application Priority Data

Feb. 5, 2015 (KR) .......................... 10-2015-0018105

(51) Int. Cl.
*F21V 8/00* (2006.01)

(52) U.S. Cl.
CPC ......... *G02B 6/0031* (2013.01); *G02B 6/0068* (2013.01); *G02B 6/0091* (2013.01); *G02B 6/0023* (2013.01); *G02B 6/0046* (2013.01)

(58) Field of Classification Search
CPC .. G02B 6/0031; G02B 6/0068; G02B 6/0023; G02B 6/0046; G02B 6/0088; G02B 6/0091; G02B 6/0013; G02F 1/1335; G02F 1/133615; G02F 2001/133314
See application file for complete search history.

(56) References Cited

U.S. PATENT DOCUMENTS

| | | | |
|---|---|---|---|
| 7,548,287 B2* | 6/2009 | Oh .................. | G02B 6/0091 349/150 |
| 8,358,387 B2* | 1/2013 | Choi ................. | G02B 6/009 349/150 |
| 8,919,985 B2* | 12/2014 | Cheng ............... | G02F 1/133382 362/113 |
| 9,019,444 B2* | 4/2015 | Tang ................. | G02B 6/0023 349/110 |
| 9,158,056 B2* | 10/2015 | Takada .............. | G02B 6/0068 |

(Continued)

FOREIGN PATENT DOCUMENTS

| | | |
|---|---|---|
| JP | 2005017613 | 1/2005 |
| JP | 2005321586 | 11/2005 |

(Continued)

*Primary Examiner* — Peggy Neils
(74) *Attorney, Agent, or Firm* — F. Chau & Associates, LLC

(57) ABSTRACT

A display apparatus includes a display panel which receives light to display an image. A light guide plate guides the light toward the display panel. A light source unit is disposed at a first side of the light guide plate to provide the light to the light guide plate. The light source unit includes a printed circuit board which includes a first area and a second area. A first light source is disposed on the first area and generates the light. A first stepped part is disposed on the second area and faces the first light source. A first adhesive part is disposed on the second area. The first stepped part reflects the light which is generated from the first light source toward the light guide plate, and the first adhesive part attaches the printed circuit board to the light guide plate.

17 Claims, 7 Drawing Sheets

(56) References Cited

U.S. PATENT DOCUMENTS 9,459,395 B2 * 10/2016 Jung .................... G02B 6/0031
2011/0228532 A1 * 9/2011 Ijzerman .............. G02B 6/0036
362/235

FOREIGN PATENT DOCUMENTS

| JP | 2007250197 | 9/2007 |
|----|------------|--------|
| JP | 2012226964 | 11/2012 |
| KR | 1020060035168 | 4/2006 |
| KR | 1020130074553 | 7/2013 |

* cited by examiner

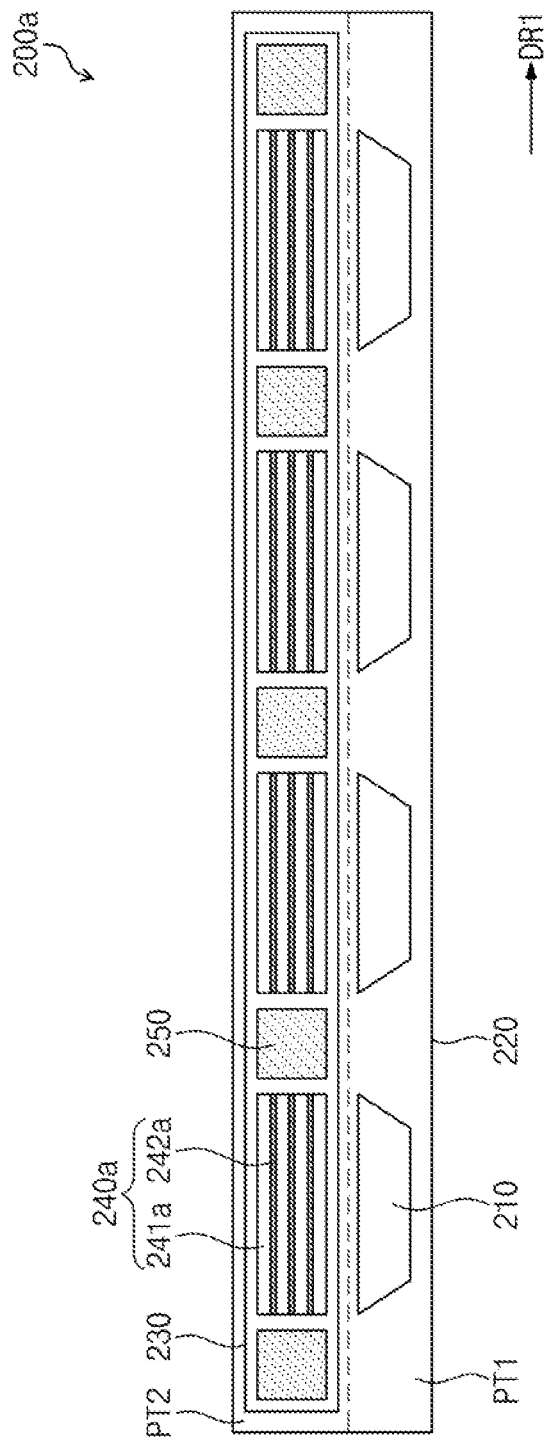

BACKLIGHT UNIT AND A DISPLAY APPARATUS INCLUDING THE SAME

CROSS-REFERENCE TO RELATED APPLICATION

This U.S. non-provisional patent application claims priority under 35 U.S.C. § 119 to Korean Patent Application No. 10-2015-0018105, filed on Feb. 5, 2015, the disclosure of which is incorporated by reference herein in its entirety.

TECHNICAL FIELD

The present invention relates to a backlight unit and a display apparatus including the same, and more particularly, to a backlight unit for providing uniform brightness and a display apparatus including the same.

DISCUSSION OF THE RELATED ART

Non-self-luminous display apparatuses, such as liquid crystal display apparatuses, electrophoretic display apparatuses, and electrowetting display apparatuses, require a backlight unit for a light source. Backlight units are classified into edge types and direct types depending on where their light emitting units are placed. For example, an edge-type backlight may include light-emitting diodes at an edge of a display panel on which an image is displayed.

An edge-type backlight unit may have a smaller thickness than a direct-type backlight unit. Thus, the edge-type backlight unit has been frequently used in a portable display apparatus.

SUMMARY

According to an exemplary embodiment of the present invention, a display apparatus includes a display panel which receives light to display an image. A light guide plate guides the light toward the display panel. A light source unit is disposed at a first side of the light guide plate to provide the light to the light guide plate. The light source unit includes a printed circuit board which includes a first area and a second area. A first light source is disposed on the first area and generates the light. A first stepped part is disposed on the second area and faces the first light source. A first adhesive part is disposed on the second area. The first stepped part reflects the light which is generated from the first light source toward the light guide plate, and the first adhesive part attaches the printed circuit board to the light guide plate.

In an exemplary embodiment of the present invention, the second area overlaps the light guide plate in a plan view.

In an exemplary embodiment of the present invention, the display apparatus further includes a second light source, a second stepped part, and a second adhesive part. The first area and the second area, respectively, extend along a first direction. The first and second light sources are arranged along the first direction, and the first and second stepped parts and the first and second adhesive parts are alternately arranged along the first direction.

In an exemplary embodiment of the present invention, a thickness of the first adhesive part is greater than a thickness of the first stepped part.

In an exemplary embodiment of the present invention, the light source unit further includes a reflective part which is disposed between the first stepped part and the printed circuit board, and between the first adhesive part and the printed circuit board.

In an exemplary embodiment of the present invention, the first stepped part includes a light reflective material.

In an exemplary embodiment of the present invention, the first stepped part includes a step compensating member and a reflection layer including the light reflective material. The reflection layer is disposed on the step compensating member.

In an exemplary embodiment of the present invention, the first stepped part includes a light reflecting part and a light absorbing part.

In an exemplary embodiment of the present invention, the display apparatus further includes a bottom chassis which accommodates the light guide plate and the light source unit.

In an exemplary embodiment of the present invention, a reflection layer including a light reflective material is disposed on the bottom chassis.

In an exemplary embodiment of the present invention, the bottom chassis includes a recessed portion in which the light source unit is accommodated, a bottom portion in which the light guide plate is accommodated, and an inclined portion connecting the recessed portion to the bottom portion. The bottom chassis further includes a light absorbing member which is disposed on the inclined portion.

In an exemplary embodiment of the present invention, the display apparatus further includes a reflective sheet which is disposed between the light guide plate and the bottom chassis.

In an exemplary embodiment of the present invention, the light source is a side-emitting light source.

According to an exemplary embodiment of the present invention, a backlight unit includes a light source unit for providing light. A light guide plate receives the light and guides the light. A bottom chassis holds the light source unit and the light guide plate. The light source unit includes a printed circuit board including a first area and a second area. At least one light source is disposed on the first area and generates the light. At least one stepped part is disposed on the second area to face the light source. At least one adhesive part is disposed on the second area. The stepped part reflect the lights, which is generated from the light source, toward the light guide plate, and the adhesive part attaches the printed circuit board to the light guide plate.

In an exemplary embodiment of the present invention, the second area overlaps the light guide plate in a plan view.

In an exemplary embodiment of the present invention, the stepped part includes a light reflecting part and a light absorbing part.

In an exemplary embodiment of the present invention, the bottom chassis includes a recessed portion in which the light source unit is held, a bottom portion in which the light guide plate is held, and an inclined portion connecting the recessed portion to the bottom portion. The bottom chassis further includes a light absorbing member which is disposed on the inclined portion.

In an exemplary embodiment of the present invention, a reflection layer including a light reflective material is disposed on the bottom chassis.

According to an exemplary embodiment of the present invention, a display apparatus includes a display panel. A light guide plate includes an incident light surface and a light emitting surface. The incident light surface is a side surface of the light guide plate. A light source unit includes a printed circuit board having a first region and a second region, the first and second regions, respectively, extending along a first direction.

A light source is disposed in the first region of the printed circuit board. The light source emits light to a top surface of the printed circuit board, and the light source faces the incident light surface of the light guide plate. A stepped part reflects light emitted from the light source. The stepped part is disposed in the second region of the printed circuit board in front of a light emitting surface of the light source. An adhesive part is disposed in the second region of the printed circuit board. The adhesive part has a first height with respect to the printed circuit board. The stepped part has a second height with respect to the printed circuit board. The first height is greater than the second height In an exemplary embodiment of the present invention, the stepped part includes a light reflecting part and a light absorbing part.

BRIEF DESCRIPTION OF THE DRAWINGS

The above and other features of the present invention will become more apparent by describing in detail exemplary embodiments thereof with reference to the accompanying drawings. In the drawings:

FIG. 3 is a plan view illustrating a light source unit according to an exemplary embodiment of the present invention;

DETAILED DESCRIPTION OF THE EMBODIMENTS

Figure 1:
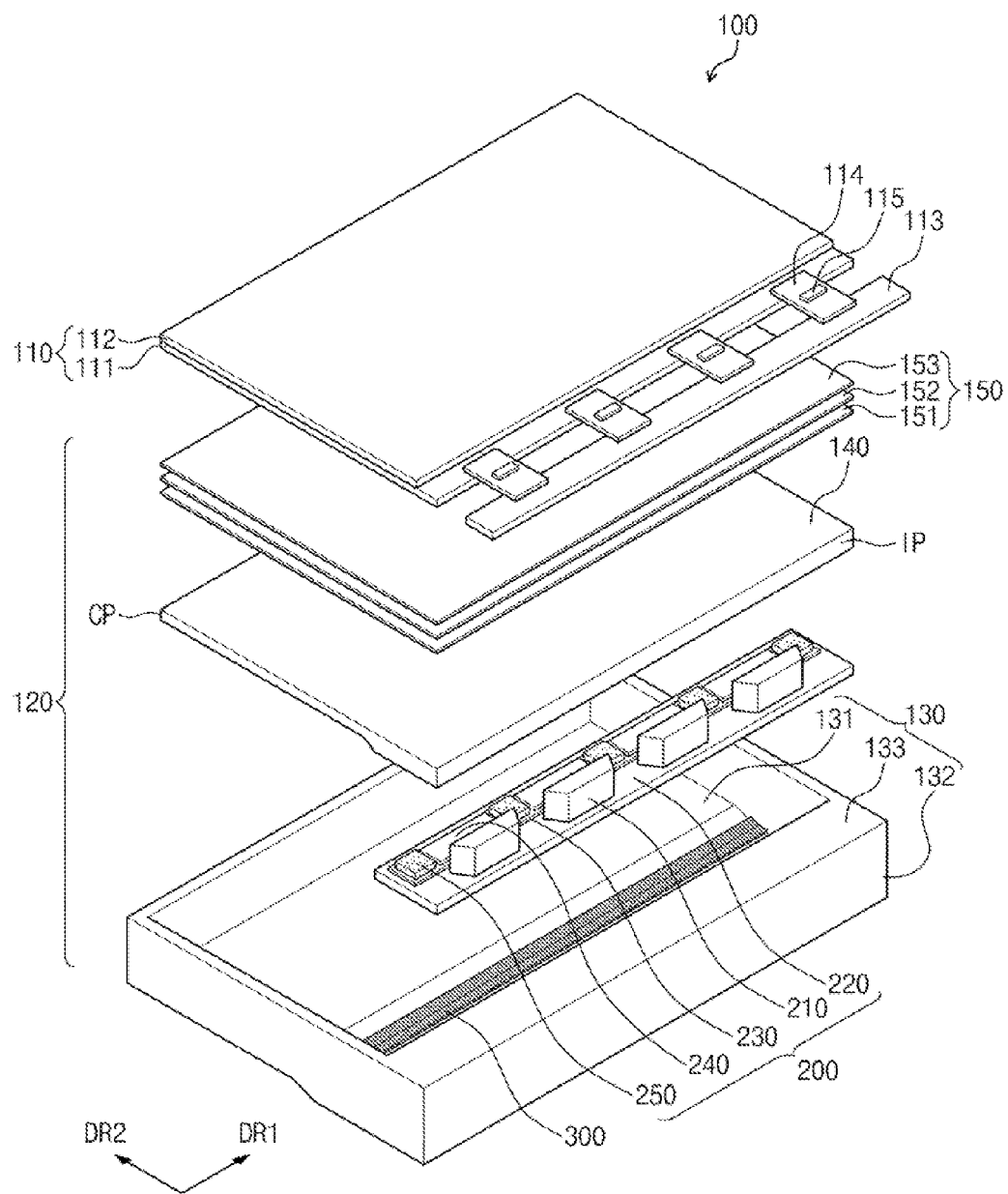
FIG. 1 is an exploded perspective view illustrating a display apparatus according to an exemplary embodiment of the present invention.

Exemplary embodiments of the present invention will be described more fully hereinafter with reference to the accompanying drawings. The present invention may, however, be embodied in different forms and should not be construed as limited to the embodiments set forth herein. Like reference numerals may refer to like elements throughout the specification.

When a part such as a layer, region, or element is referred to as being "on" another part, it can be directly on the other part or intervening parts may also be present.

Figure 2A:
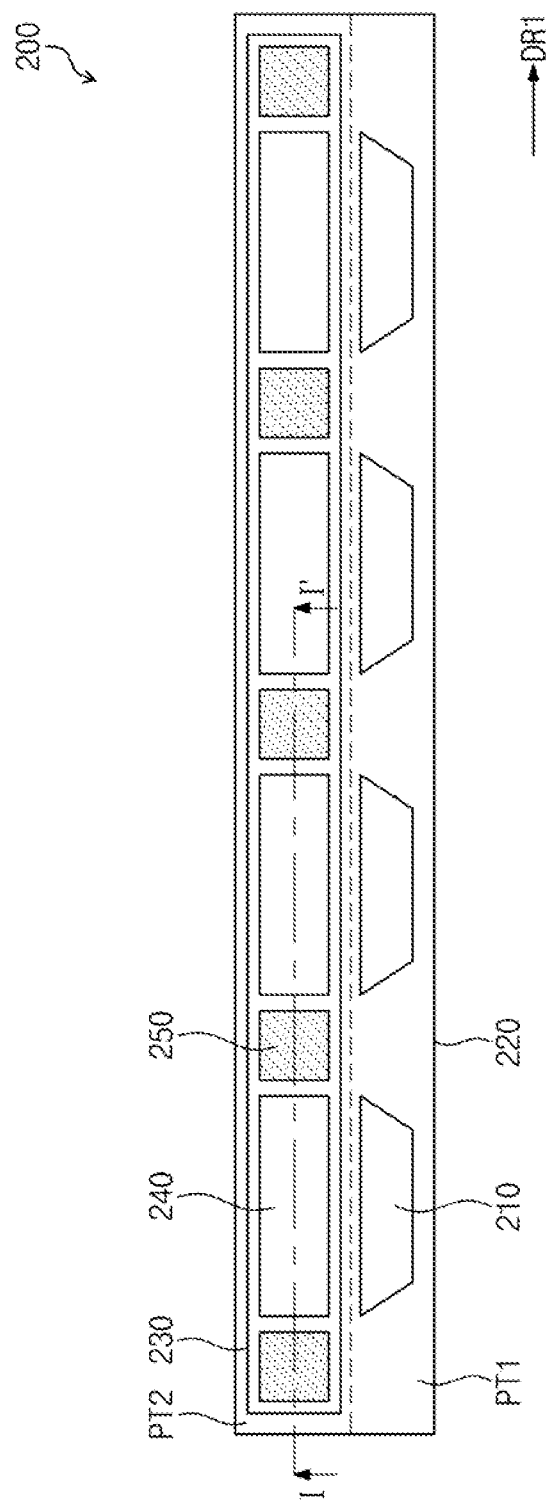
FIG. 2A is a plan view of a light source unit which is illustrated in FIG. 1, according to an exemplary embodiment of the present invention.

FIG. 1 is an exploded perspective view illustrating a display apparatus according to an exemplary embodiment of the present invention, and FIG. 2A is a plan view of a light source unit which is illustrated in FIG. 1, according to an exemplary embodiment of the present invention.

Referring to FIGS. 1 and 2A, a display apparatus 100 may include a display panel 110 and a backlight unit 120.

The display panel 110 displays an image. The display panel 110 may be a liquid crystal display panel, an electrowetting display panel, an electrophoretic display panel, or a microelectromechanical system (MEMS) display panel. In the present embodiment, the liquid crystal display panel is described as an example.

The display panel 110 may be a rectangular plate having two pairs of sides. In the present embodiment, the display panel 110 may be a rectangle having a pair of long sides and a pair of short sides. The display panel 110 includes a display substrate 111, a facing substrate 112 facing the display substrate 111, and a liquid crystal layer which is disposed between the display substrate 111 and the facing substrate 112. In a plan view, the display panel 110 may have a display area, in which an image is displayed, and a non-display area surrounding the display area in which an image is not displayed.

In a plan view, a data driving chip 115 for applying a data signal to a data line may be disposed on at least one side of the display substrate 111. The data driving chip 115 may generate the data signal to be applied to the data line of the display panel 110 in response to an external signal. The external signal is a signal that is applied from a printed circuit board 113. An image signal, various control signals, and a driving voltage may be included in the external signal.

The printed circuit board 113 may be electrically connected to the display panel 110 through a plurality of tape carrier packages (TCPs) 114. The data driving chip 115 may be mounted on the plurality of TCPs 114. The printed circuit board 113 may be disposed at a sidewall 132 of a bottom chassis 130.

In an exemplary embodiment of the present invention, the plurality of TCPs 114 may be bent to surround a side of the bottom chassis 130. The printed circuit board 113 connected to the plurality of TCPs 114 may be disposed under the bottom chassis 130. In this case, the display apparatus 100 may further include a shield case for protecting the printed circuit board 113 by being disposed under the bottom chassis 130.

The backlight unit 120 provides light to the display panel 110 and the backlight unit 120 is disposed under the display panel 110. The backlight unit 120 may include the bottom chassis 130, a light guide plate 140, optical sheets 150, and a light source unit 200.

The bottom chassis 130 may include an accommodating part 131, the sidewall 132 extending from the accommodating part 131, and a cover 133 which extends parallel to the accommodating part 131 from the sidewall 132 to cover the light source unit 200. The sidewall 132 may extend in an upward direction from the accommodating part 131. The bottom chassis 130 accommodates the light source unit 200 and the light guide plate 140. The light source unit 200 and the light guide plate 140 may be stably placed in the accommodating part 131.

The optical sheets 150 may be disposed between the light guide plate 140 and the display panel 110. The optical sheets 150 may control the path of light which is guided from the light guide plate 140. The optical sheets 150 may include a diffuser sheet 151, a prism sheet 152, and a protective sheet 153.

The diffuser sheet 151 diffuses light. The prism sheet 152 may collect the light diffused from the diffuser sheet 151 and may propagate the diffused light in a direction close to a normal direction of the display panel 110. The normal direction of the display panel 100 is perpendicular or substantially perpendicular to a surface of the display panel 100, for example. The protective sheet 153 may protect the prism sheet 152 from an external impact. In the present embodiment, the optical sheets 150 include a single diffuser sheet 151, a single prism sheet 152, and a single protective sheet 153. However, the present invention is not limited thereto. For example, the optical sheets 150 may include a plurality of diffuser sheets 151, a plurality of the prism sheets 152, and a plurality of protective sheet 153. Further, one of the optical sheets 150 may be omitted. For example, one of the diffuser sheet 151, the prism sheet 152, or the protective sheet 153 may be omitted. In addition, in an exemplary embodiment of the present invention, functions of the optical sheets 150 may be integrally provided to the light guide plate 140 by forming a pattern in the light guide plate 140.

The light source unit 200 is disposed at one side of the light guide plate 140 and may provide light to the light guide plate 140. The light source unit 200 may include a light source 210, a printed circuit board 220, a reflective part 230, a stepped part 240, and an adhesive part 250.

A first area PT1 and a second area PT2 may be defined in the printed circuit board 220. The first area PT1 and the second area PT2 may respectively extend along a first direction DR1. In an exemplary embodiment of present invention, the second area PT2 may overlap with the light guide plate 140, and for example, the second area PT2 may be disposed between the light guide plate 140 and the accommodating part 131.

The light source 210 may be disposed at the first area PT1, and the reflective part 230, the stepped part 240, and the adhesive part 250 may be disposed at the second area PT2. When the light source 210 is provided in plural, the plurality of light sources 210 may be arranged along the first direction DR1. When the stepped part 240 and the adhesive part 250 are provided in plural, the plurality of stepped parts 240 and adhesive parts 250 may be arranged to be alternately repeated along the first direction DR1.

The light source 210 may be mounted on the printed circuit board 220 so that the light source 210 may receive a driving voltage from the printed circuit board 220. In the present embodiment, the light source 210 may be a side-emitting light source. Thus, the light source 210 may emit light parallel to the printed circuit board 220 from a side of the light guide plate 140.

The reflective part 230 may be disposed on the printed circuit board 220. The reflective part 230 may be provided on the printed circuit board 220 by using an ink including a reflective material. In the present embodiment, it is illustrated that the reflective part 230 is disposed only at the second area PT2, but the present invention is not limited thereto. For example, the reflective part 230 may be disposed over the entire area of the printed circuit board 220. In this case, the reflective part 230 may be disposed on the entire surface of the printed circuit board 220 by printing the ink including the reflective material on the printed circuit board 220 before the light source 210 is mounted on the printed circuit board 220. However, the present invention is not limited thereto. For example, in an exemplary embodiment of the present invention, the reflective part 230 may be omitted.

The stepped part 240 may be disposed to face the light source 210. A pitch between a first stepped part 240 and a second stepped part 240 adjacent to the first stepped part 240 may be substantially the same as a pitch between two adjacent light sources 210.

The stepped part 240 may reflect light which is emitted toward the printed circuit board 220 from the light source 210, toward the light guide plate 140. In addition, a spacing between the printed circuit board 220 and the light guide plate 140 may be filled by the stepped part 240. Thus, the stepped part 240 may prevent a leakage of the light emitted from the light source 210 to the outside of the display apparatus 100. As a result, the use efficiency of the light emitted from the light source 210 may be increased.

In the present embodiment, the stepped part 240 may include substantially the same reflective material as the reflective part 230. For example, the stepped part 240 may be provided on the reflective part 230 by reprinting the same reflective material included in the reflective part 230 on the same footprint of the stepped part 240. In this case, the stepped part 240 may be integrally provided with the reflective part 230.

The adhesive part 250 may attach the printed circuit board 220 to the light guide plate 140. The second area PT2 of the printed circuit board 220 may be attached to a rear surface of the light guide plate 140 by the adhesive part 250. The adhesive part 250 may include a variety of adhesives, for example, the adhesive part 250 may be a double-sided tape.

The adhesive part 250 and the stepped part 240 may be alternately disposed one by one on the printed circuit board 220. For example, a stepped part 240 is disposed in front of a light source 210 along a second direction DR2. The stepped part 240 is also disposed between two consecutive adhesive parts 250. The two consecutive adhesive parts 250 are disposed along the first direction DR1 that crosses the second direction DR2 at a substantially perpendicular angle. The adhesive part 250 may be disposed to face a region between two adjacent light sources 210. The adhesive part 250 may not be disposed at a front end of a light emitting window through which light is emitted from the light source 210. Accordingly, since the light emitted from the light source 210 is not reflected by the adhesive part 250 but is reflected by the stepped part 240, scattering of the light emitted from the light source 210 by the adhesive part 250 may be reduced. Thus, the delivery of light from an incident light part IP of the light guide plate 140 to an opposing light part CP of the light guide plate 140 may be facilitated. As a result, the backlight unit 120 may provide light having uniform brightness to the display panel 110, and the display quality of the display apparatus 100 may be increased.

Figure 2B:
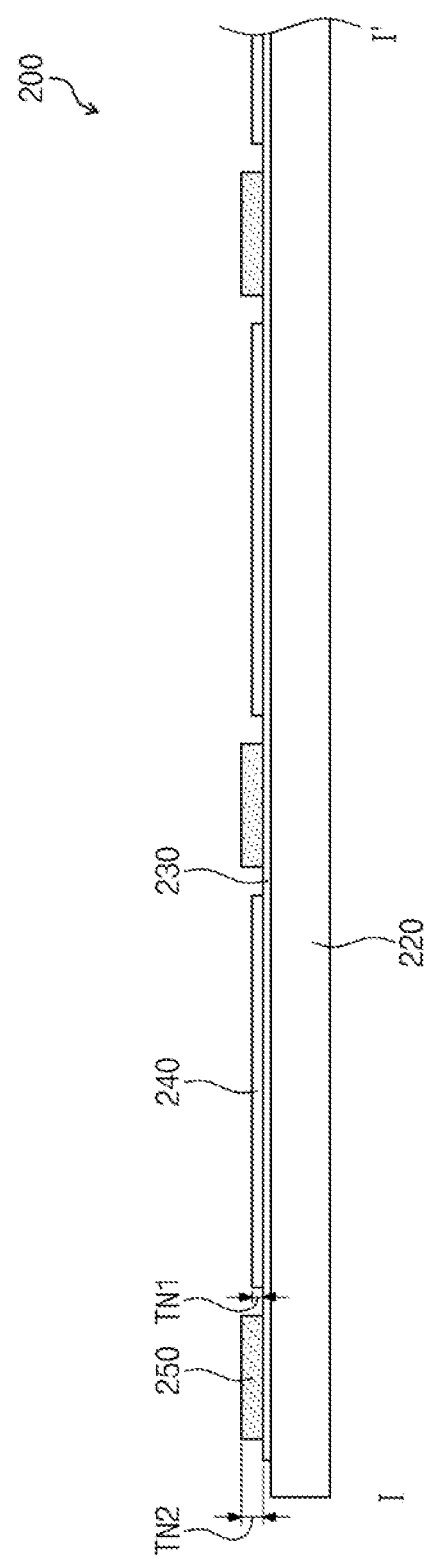
FIG. 2B is a cross-sectional view taken along line I-I' of FIG. 2A, according to an exemplary embodiment of the present invention.

FIG. 2B is a cross-sectional view taken along line I-I' of FIG. 2A, according to an exemplary embodiment of the present invention. In describing FIG. 2B, the same reference numerals described with reference to FIG. 2A will be employed and thus the descriptions thereof may be omitted.

Referring to FIG. 1 and FIG. 2B, the stepped part 240 and the adhesive part 250 may be alternately disposed along the first direction DR1.

In the present embodiment, a thickness TN1 of the stepped part 240 may be in a range of about 10 μm to about 50 μm. In the case that the thickness TN1 of the stepped part 240 is less than 10 μm, light may leak through a gap between the light guide plate 140 and the printed circuit board 220. As a result, a hot spot may occur in which brightness is increased in a region of the display panel 110 corresponding to the incident light part IP of the light guide plate 140. In addition, in the case in which the thickness TN1 of the stepped part 240 is greater than 50 μm, the light emitted from the light source 210 is reflected by the stepped part 240 back toward the light source 210, and thus, incident light efficiency may be reduced. However, in an exemplary embodiment of the present invention, the thickness TN1 of the stepped part 240 is not limited to the range of about 10 μm to about 50 μm. For example, the thickness TN1 of the stepped part 240 may have a wide range of values in consideration of the size of the light source 210 or the spacing between the printed circuit board 220 and the light guide plate 140.

In an exemplary embodiment of the present invention, the thickness TN1 of the stepped part 240 may be smaller than a thickness TN2 of the adhesive part 250. Since the adhesive part 250 may be more extruded from the printed circuit board 220 than the stepped part 240, the printed circuit board 220 may be attached to the light guide plate 140.

The light guide plate 140 and the light source 210 may have a structure that is integrally fixed by the adhesive part 250. Accordingly, since the light source 210 and the light guide plate 140 are fixed together, the leakage of light to the outside of the display apparatus 100 may be prevented. For example, such light leakage may be prevented in the case in which the light guide plate 140 moves or is deformed by heat.

FIG. 3 is a plan view illustrating a light source unit according to an exemplary embodiment of the present invention. In describing FIG. 3, the same reference numerals described with reference to FIG. 2A will be employed and thus the descriptions thereof may be omitted.

Referring to FIG. 3, a light source unit 200a may include a light source 210, a printed circuit board 220, a reflective part 230, a stepped part 240a, and an adhesive part 250.

The stepped part 240a may include a light reflecting part 241a and a light absorbing part 242a. A luminosity of the light reflecting part 241a may be higher than a luminosity of the light absorbing part 242a, and the luminosity of the light absorbing part 242a may be lower than the luminosity of the light reflecting part 241a.

The light reflecting part 241a may reflect light emitted from the light source 210 toward the light guide plate 140, and the light absorbing part 242a may absorb a portion of the light emitted from the light source 210. A hot spot phenomenon, in which light is focused on an area of the display panel 110 to increase the brightness of the display panel 110 on that area, may be prevented. For example, this may be done by adjusting the amount of light, which is reflected from the stepped part 240a that is disposed at a front end of the light source 210, that passes through the light absorbing part 242a.

The light reflecting part 241a and the light absorbing part 242a may be arranged to be alternately repeated on the printed circuit board 220. In the present embodiment, the light reflecting part 241a and the light absorbing part 242a are alternately and repetitively arranged in a stripe form. However, the present invention is not limited thereto. For example, in an exemplary embodiment of the present invention, the light reflecting part 241a and the light absorbing part 242a may be provided in various shapes such as a grid pattern, a dot pattern, or a wave pattern.

The amount of the light reflected from the stepped part 240a may be controlled by adjusting the area, density, or luminosity of the light absorbing part 242a. The light absorbing part 242a may be provided by attaching a gray or black tape on the light reflecting part 241a or may be provided by printing a gray or black ink on the light reflecting part 241a.

Figure 4A:
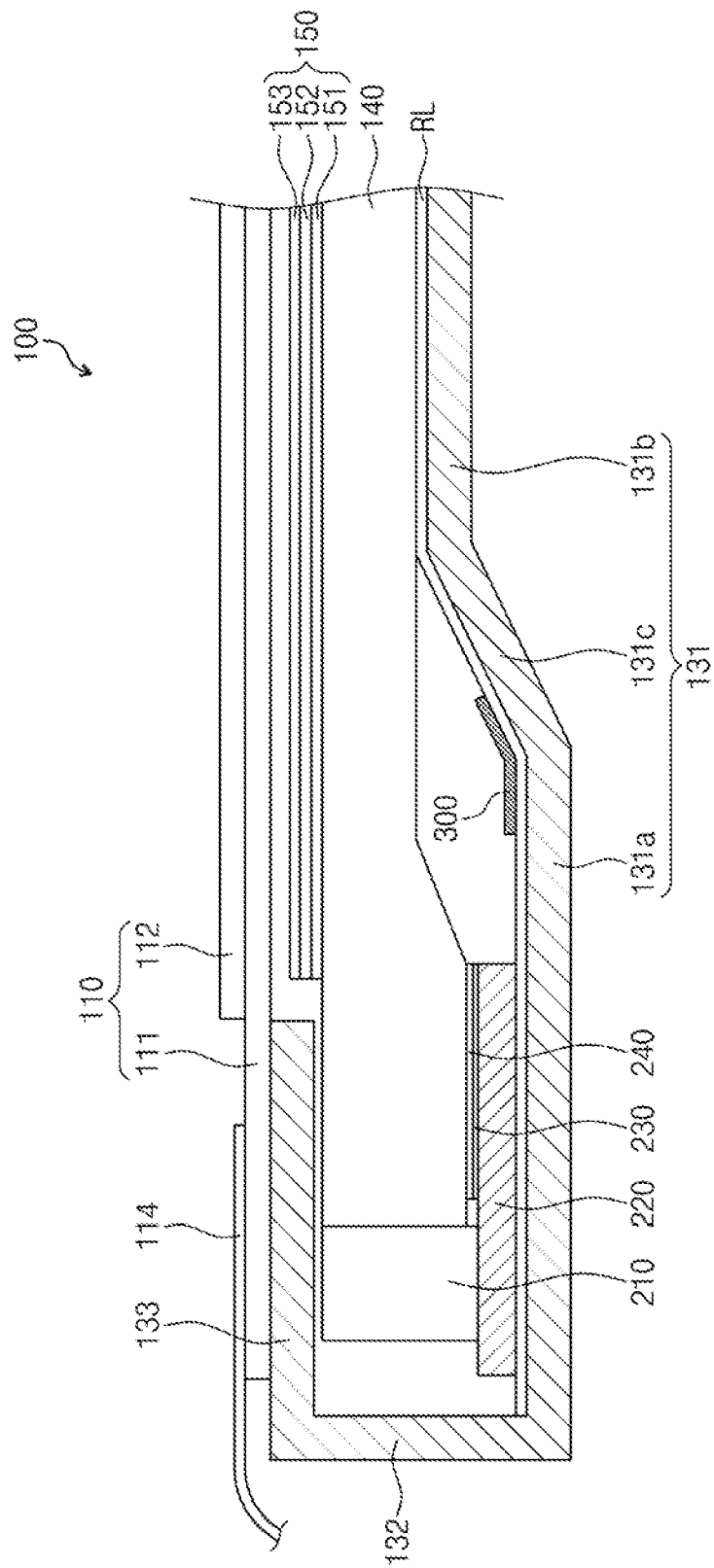
FIG. 4A is a schematic cross-sectional view of the display apparatus which is illustrated in FIG. 1, according to an exemplary embodiment of the present invention.

FIG. 4A is a schematic cross-sectional view of the display apparatus which is illustrated in FIG. 1, according to an exemplary embodiment of the present invention. In describing FIG. 4A, the same reference numerals described with reference to FIG. 1 will be employed and thus the descriptions thereof may be omitted.

Referring to FIGS. 1 and 4A, a reflection layer RL including a light reflective material may be disposed on the bottom chassis 130. The reflection layer RL may be integrally provided with the bottom chassis 130 by printing the reflection layer RL on the bottom chassis 130. In the present embodiment, it is illustrated that the reflection layer RL is printed only on the accommodating part 131, but the present invention is not limited thereto. For example, the reflection layer RL may be printed on all of the inner surfaces of the accommodating part 131, the sidewall 132, and the cover 133.

The light reflective material may include a variety of reflective materials, for example, the light reflective material may include potassium (K), phosphorus (P), magnesium (Mg), lithium (Li), calcium (Ca), germanium (Ge), chromium (Cr), silver (Ag), gold (Au), copper (Cu), palladium (Pd), iridium (Ir), rhodium (Rh), platinum (Pt), aluminum (Al), nickel (Ni), titanium (Ti), tungsten (W), beryllium (Be), silicon (Si), iron (Fe), or a compound thereof. In addition, the reflection layer RL may be provided by printing an ink of a white color on the bottom chassis 130. The ink of a white color may include the above-described light reflective material and, for example, may include a material such as $TiO_2$ or $SiO_2$.

The accommodating part 131 of the bottom chassis 130 may include a recessed portion 131a, a bottom portion 131b, and an inclined portion 131c. The light source unit 200 may be accommodated in the recessed portion 131a and the light guide plate 140 may be accommodated in the bottom portion 131b. The inclined portion 131c may connect the recessed portion 131a to the bottom portion 131b.

To reduce a thickness of the display apparatus 100, the light guide plate 140 may have a small thickness, and accordingly, the thickness of the bottom chassis 130 may be decreased. Thus, a region of the bottom chassis 130, where the light source unit 200 is mounted, may be concavely provided to secure a space where the light source unit 200 is mounted. In the light guide plate 140, to increase incident light efficiency, a thickness of the incident light part IP of the light guide plate 140 may be greater than a thickness of the opposing light part CP of the light guide plate 140. Therefore, the light guide plate 140 may have a tapered shape.

In the present embodiment, a light absorbing member 300 may be disposed on the inclined portion 131c. The light absorbing member 300 may be disposed to cover an area where the recessed portion 131a and the inclined portion 131c meet. The light absorbing member 300 may include a gray or black tape or a gray or black ink.

The light absorbing member 300 may prevent a phenomenon in which a portion of the light emitted from the light source 210 is reflected by the inclined portion 131c to be directly provided toward the display panel 110. When the light reflected by the inclined portion 131c is directly provided toward the display panel 110, a hot spot phenomenon may occur in which the brightness on a region of the display panel 100 is high. However, according to the present embodiment, since the light incident to the inclined portion 131c is absorbed by the light absorbing member 300, the hot spot phenomenon may be prevented.

Figure 4B:
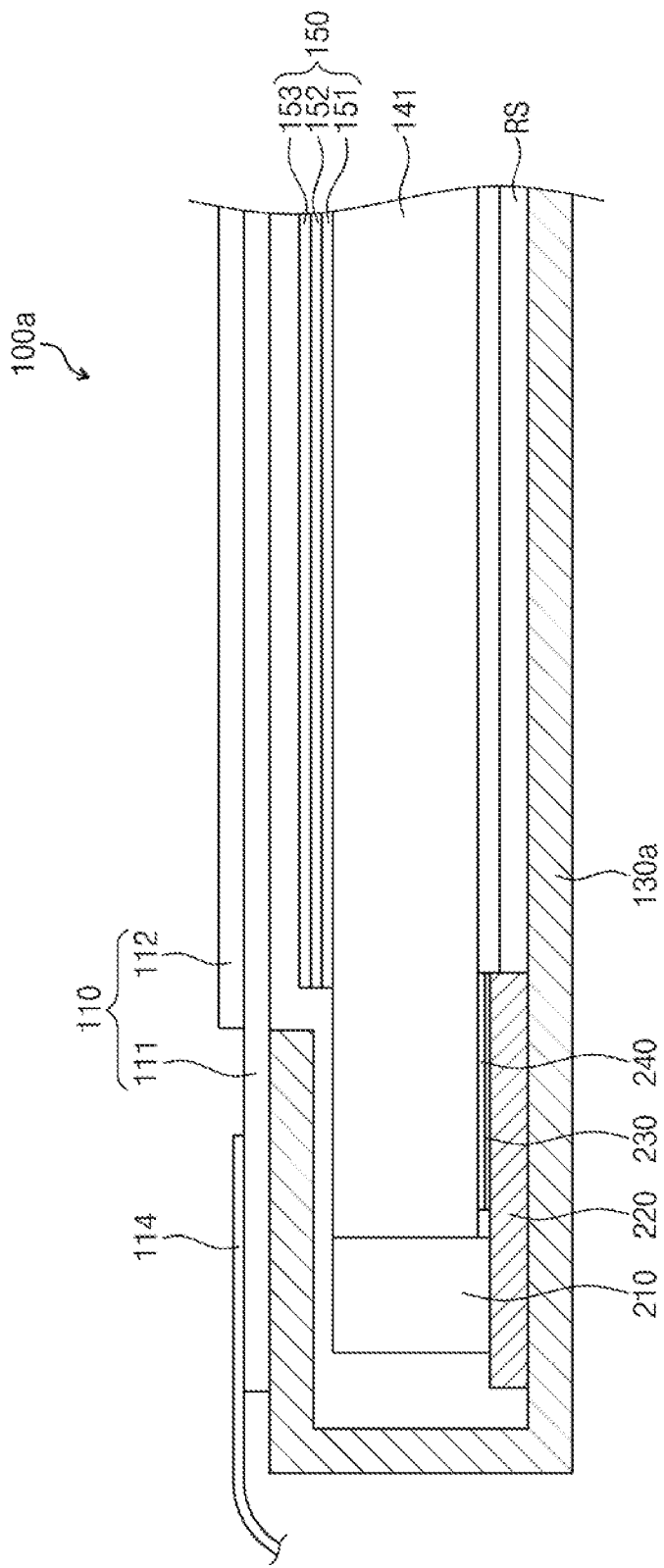
FIG. 4B is a schematic cross-sectional view illustrating a display apparatus according to an exemplary embodiment of the present invention.

FIG. 4B is a schematic cross-sectional view illustrating a display apparatus according to an exemplary embodiment of the present invention. In describing FIG. 4B, the same reference numerals described with reference to FIG. 1 will be employed and thus the descriptions thereof may be omitted.

Referring to FIG. 4B, a reflective sheet RS may be disposed between a light guide plate 141 and a bottom chassis 130a. The reflective sheet RS may reflect light leaked from the light guide plate 141 back toward the light guide plate 141.

A stepped part 240 is disposed between the light guide plate 141 and a printed circuit board 220. The stepped part 240 may reflect light, which is emitted toward the printed circuit board 220 among light emitted from a light source 210, toward the light guide plate 141. In addition, a spacing between the printed circuit board 220 and the light guide plate 141 may be filled by the stepped part 240. Thus, the leakage of the light emitted from the light source 210 to the outside of the light guide plate 141 may be prevented. As a result, light-use efficiency of a display apparatus 100a may be increased.

Figure 5:
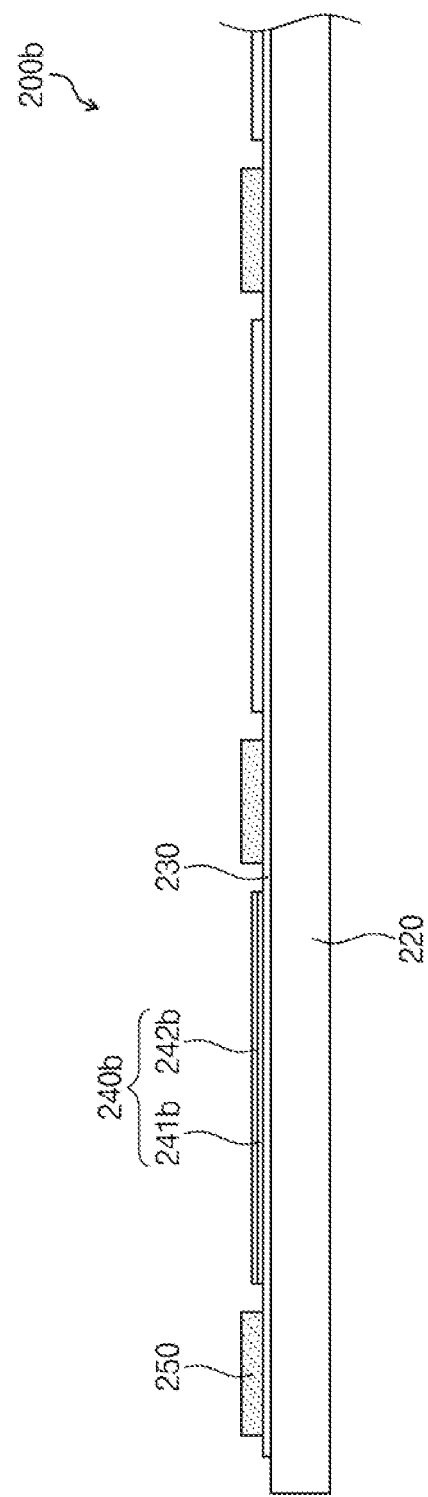
FIG. 5 is a cross-sectional view illustrating a light source unit according to an exemplary embodiment of the present invention.

FIG. 5 is a cross-sectional view illustrating a light source unit according to an exemplary embodiment of the present invention. In describing FIG. 5, the same reference numerals described with reference to FIG. 2A will be employed and thus the descriptions thereof may be omitted.

Referring to FIG. 5, a light source unit 200b may include a light source (e.g., the light source 210 of FIG. 1), a printed circuit board 220, a reflective part 230, a stepped part 240b, and an adhesive part 250.

In the present embodiment, the stepped part 240b may include a step compensating member 241b and a reflection layer 242b.

The step compensating member 241b may have a predetermined thickness. The step compensating member 241b is a layer of a predetermined thickness on which the reflection layer 242b is disposed on. Thus, the thickness of the stepped part 240b is a sum of the thickness of the step compensating member 241b and the thickness of the reflection layer 242b. The step compensating member 241b may have a hexahedral structure. The step compensating member 241b may be attached to the printed circuit board 220. In an exemplary embodiment of the present invention, the step compensating member 241b may be integrally provided with the printed circuit board 220. In this case, the step compensating member 241b may be formed simultaneously with the printed circuit board 220 in a process of manufacturing the printed circuit board 220.

The reflection layer 242b may include a light reflective material. The reflection layer 242b may be printed on the step compensating member 241b to reflect light, which is emitted toward the printed circuit board 220 among light emitted from the light source (e.g., the light source 210 of FIG. 1), toward the light guide plate (e.g., the light guide plate 140 of FIG. 1).

The light reflective material may include a variety of materials such as those described above. The reflection layer 242b may be provided by printing an ink of a white color on the step compensating member 241b. The ink of a white color may include the above-described light reflective material and, for example, may include a material such as $TiO_2$ or $SiO_2$.

The stepped part 240b may reflect the light, which is emitted toward the printed circuit board 220 among the light emitted from the light source (e.g., the light source 210 of FIG. 1), toward the light guide plate (e.g., the light guide plate 140 of FIG. 1). In addition, a spacing between the printed circuit board 220 and the light guide plate (e.g., the light guide plate 140 of FIG. 1) may be filled by the stepped part 240b. Thus, the leakage of the light emitted from the light source 210 to the outside of the light guide plate (e.g., the light guide plate 140 of FIG. 1) may be prevented. As a result, light-use efficiency of light emitted from the light source 210 may be increased.

Furthermore, in FIG. 5, a light absorbing part may be disposed on the reflection layer 242b as illustrated in FIG. 3. The light absorbing part may be provided by attaching a gray or black tape on the reflection layer 242b and may be provided by printing a gray or black ink on the reflection layer 242b. The amount of the light reflected from the stepped part 240b may be controlled by adjusting the area, density, or luminosity of the light absorbing part. The hot spot phenomenon, in which light is focused to increase the brightness of a particular region of the display panel 110, may be prevented by adjusting the amount of light, which is reflected from the stepped part 240b that is disposed at a front end of the light source (e.g., the source 210 of FIG. 1), through the light absorbing part.

As described above, a stepped part may prevent light leakage defects by reflecting light, which is generated from a light source, toward a light guide plate. Thus, light-use efficiency of a display apparatus may be increased. In addition, since a hot spot phenomenon generated due to light leakage may be prevented, a backlight unit may provide light having uniform brightness to a display panel. As a result, a display quality of a display apparatus may be increased.

While the inventive concept has been particularly shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A display apparatus comprising:
  a display panel which receives light to display an image;
  a light guide plate which guides the light toward the display panel;
  a light source unit which is disposed at a first side of the light guide plate to provide the light to the light guide plate; and
  a bottom chassis which accommodates the light guide plate and the light source unit, wherein the bottom chassis comprises a recessed portion in which the light source unit is accommodated, a bottom portion in which the light guide plate is accommodated, and an inclined portion connecting the recessed portion to the bottom portion, and the bottom chassis further comprises a light absorbing member which is disposed on the inclined portion,
  wherein the light source unit comprises:
  a printed circuit board which includes a first area and a second area;
  a first light source which is disposed on the first area and generates the light;
  a first stepped part which is disposed on the second area and faces the first light source; and
  a first adhesive part which is disposed on the second area,
  wherein the first stepped part reflects the light which is generated from the first light source toward the light guide plate, and the first adhesive part attaches the printed circuit board to the light guide plate.

2. The display apparatus of claim 1, wherein the second area overlaps the light guide plate in a plan view.

3. The display apparatus of claim 1, wherein the display apparatus further includes a second light source, a second stepped part, and a second adhesive part, wherein the first area and the second area, respectively, extend along a first direction, and
  wherein the first and second light sources are arranged along the first direction, and the first and second stepped parts and the first and second adhesive parts are alternately arranged along the first direction.

4. The display apparatus of claim 1, wherein a thickness of the first adhesive part is greater than a thickness of the first stepped part.

5. The display apparatus of claim 1, wherein the light source unit further comprises a reflective part which is disposed between the first stepped part and the printed circuit board, and between the first adhesive part and the printed circuit board.

6. The display apparatus of claim 1, wherein the first stepped part comprises a light reflective material.

7. The display apparatus of claim 6, wherein the first stepped part comprises a step compensating member and a reflection layer including the light reflective material, and the reflection layer is disposed on the step compensating member.

8. The display apparatus of claim 1, wherein the first stepped part comprises a light reflecting part and a light absorbing part.

9. The display apparatus of claim 1 wherein a reflection layer comprising a light reflective material is disposed on the bottom chassis.

10. The display apparatus of claim 1, further comprising a reflective sheet which is disposed between the light guide plate and the bottom chassis.

11. The display apparatus of claim 1, wherein the light source is a side-emitting light source.

12. A backlight unit comprising:
a light source unit for providing light;
a light guide plate for receiving the light and guiding the light; and
a bottom chassis for holding the light source unit and the light guide plate, wherein the bottom chassis comprises a recessed portion in which the light source unit is held, a bottom portion in which the light guide plate is held, and an inclined portion connecting the recessed portion to the bottom portion, and the bottom chassis further comprises a light absorbing member which is disposed on the inclined portion,
wherein the light source unit comprises:
a printed circuit board including a first area and a second area;
at least one light source which is disposed on the first area and generates the light;
at least one stepped part which is disposed on the second area and faces the light source; and
at least one adhesive part which is disposed on the second area,
wherein the stepped part reflects the light, which is generated from the light source, toward the light guide plate, and the adhesive part attaches the printed circuit board to the light guide plate.

13. The backlight unit of claim 12, wherein the second area overlaps the light guide plate in a plan view.

14. The backlight unit of claim 12, wherein the stepped part comprises a light reflecting part and a light absorbing part.

15. The backlight unit of claim 14, wherein a reflection layer comprising a light reflective material is disposed on the bottom chassis.

16. A display apparatus comprising:
a display panel;
a light guide plate including an incident light surface and a light emitting surface, wherein the incident light surface is a side surface of the light guide plate;
a light source unit; and
a bottom chassis for holding the light source unit and the light guide plate, wherein the bottom chassis comprises a first portion in which the light source unit is held, a second portion in which the light guide plate is held, and a sloped portion connecting the first portion to the second portion, and the bottom chassis further comprises a light absorbing member which is disposed on the sloped portion, the light source unit comprising:
a printed circuit board having a first region and a second region, the first and second regions, respectively, extending along a first direction;
a light source disposed in the first region of the printed circuit board, wherein the light source emits light to a top surface of the printed circuit board, and the light source faces the incident light surface of the light guide plate;
a stepped part reflecting light emitted from the light source, wherein the stepped part is disposed in the second region of the printed circuit board in front of a light emitting surface of the light source; and
an adhesive part disposed in the second region of the printed circuit board, wherein the adhesive part has a first height with respect to the printed circuit board, the stepped part has a second height with respect to the printed circuit board, and the first height is greater than the second height.

17. The display apparatus of claim 16, wherein the stepped part includes a light reflecting part and a light absorbing part.

* * * * *